US008996723B2

(12) United States Patent
Li et al.

(10) Patent No.: US 8,996,723 B2
(45) Date of Patent: Mar. 31, 2015

(54) ISP-AWARE PEER-TO-PEER CONTENT EXCHANGE

(75) Inventors: Jin Li, Sammamish, WA (US); Cheng Huang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 783 days.

(21) Appl. No.: 11/757,987

(22) Filed: Jun. 4, 2007

(65) Prior Publication Data

US 2008/0301214 A1    Dec. 4, 2008

(51) Int. Cl.
*G06F 15/173* (2006.01)
*G06F 15/16* (2006.01)
*H04L 29/08* (2006.01)

(52) U.S. Cl.
CPC .......... *H04L 67/1021* (2013.01); *H04L 67/104* (2013.01); *H04L 67/108* (2013.01)
USPC ............ 709/238; 709/218; 709/219; 709/232

(58) Field of Classification Search
CPC .. H04L 67/1021; H04L 67/104; H04L 67/108
USPC ................................. 709/238, 218, 219, 232
See application file for complete search history.

(56) References Cited

U.S. PATENT DOCUMENTS

| 6,785,704 | B1 | 8/2004 | McCanne | |
|---|---|---|---|---|
| 2002/0078233 | A1 | 6/2002 | Biliris et al. | |
| 2002/0184310 | A1* | 12/2002 | Traversat et al. | ............. 709/204 |
| 2003/0055892 | A1 | 3/2003 | Huitema et al. | |
| 2003/0115283 | A1 | 6/2003 | Barbir et al. | |

(Continued)

FOREIGN PATENT DOCUMENTS

| CN | 1968164 | 5/2007 |
|---|---|---|
| CN | 101681341 A1 | 3/2010 |

(Continued)

OTHER PUBLICATIONS

Ruchir Bindel, Pei Cao and William Chan"Improving Traffic Locality in BitTorrent via Biased Neighbor Selection" Jul. 24, 2006 pp. 1-10 (http://crypto.stanford.edu/-cao/biased-bt.pdf).*

(Continued)

*Primary Examiner* — Linglan Edwards
*Assistant Examiner* — Lawrence Cosby
(74) *Attorney, Agent, or Firm* — Ladislav Kusnyer; Judy Yee; Micky Minhas

(57) ABSTRACT

An Internet Service Provider (ISP)-aware peer-to-peer (P2P) content exchange system and method for exchanging content over a P2P network using the Internet. The system and method accounts for the type of relationship between peers and classifies and groups each peer according to these relationships. A peer overlay is constructed such that peers within a peer's neighborhood are favored over those peers outside of the neighborhood. Peer scheduling is utilized to exchange information about the availability of blocks of content. This block availability information can be exchanged differently and its frequency changed depending on a peer's classification. Peers are selected for block exchange based on their classification. A peer selection proportion may be defined that dynamically changes depending on contents of a peer's download buffer. The blocks to be exchanged then are selected based on the block availability information, such that the rarest blocks are exchanged before the more common blocks.

20 Claims, 7 Drawing Sheets

(56) References Cited

U.S. PATENT DOCUMENTS

| | | | |
|---|---|---|---|
| 2003/0204613 A1 | 10/2003 | Hudson et al. | |
| 2003/0208621 A1* | 11/2003 | Bowman | 709/242 |
| 2004/0128013 A1* | 7/2004 | Blawat et al. | 700/100 |
| 2004/0148333 A1* | 7/2004 | Manion et al. | 709/201 |
| 2004/0148344 A1 | 7/2004 | Navar et al. | |
| 2005/0015466 A1 | 1/2005 | Tripp | |
| 2005/0198290 A1 | 9/2005 | Berkey et al. | |
| 2005/0216559 A1 | 9/2005 | Manion et al. | |
| 2005/0268102 A1* | 12/2005 | Downey | 713/176 |
| 2006/0004600 A1 | 1/2006 | Summer et al. | |
| 2006/0059248 A1 | 3/2006 | Ikeda | |
| 2006/0165014 A1 | 7/2006 | Ikeda | |
| 2007/0150481 A1* | 6/2007 | Song et al. | 707/10 |
| 2009/0177792 A1* | 7/2009 | Guo et al. | 709/231 |

FOREIGN PATENT DOCUMENTS

| | | |
|---|---|---|
| EP | 2171605 B1 | 1/2013 |
| EP | 2568686 A1 | 3/2013 |
| HK | 1182863 | 12/2013 |
| WO | WO-2004063840 A2 | 7/2004 |
| WO | WO 2005/119476 * | 10/2004 |

OTHER PUBLICATIONS

Ronaldo A. Ferreira, Suresh Jagannathan, Ananth Grama, "Locality in structured peer-to-peer networks", Nov. 15, 2005, Journal of Parallel and Distributed Computing 66 pp. 257-273.*

Ahuja, J., J.-H. Cui, L. Lao, S. Chen, Scalable peer-to-peer file sharing with efficient complex query support, Proc. of 16th Int'l Conf. on Comp. Comm. and Networks, ICCCN, Aug. 13-16, 2007, pp. 121-127.

Bharambe, A. R., C. Herley, V. N. Padmanabhan, Analyzing and improving a BitTorrent networks performance mechanisms, INFOCOM 2006, Proceedings 25th IEEE Int'l Conf. on Comp. Comm., Apr. 2006, pp. 1-12, Barcelona, Spain.

Bindal, R., P..Cao, W. Chan, J. Medved, G. Suwala, T. Bates, A. Zhang, Improving traffic locality in BitTorrent via biased neighbor selection, Proc. of the 26th IEEE Int'l Conf. on Distributed Comp. Sys., 2006, pp. 66.

Ferguson, D., Trends and statistics in peer-to-peer, Workshop on Technical and Legal Aspects of Peer-to-Peer Television, Amsterdam, Netherlands, Mar. 17, 2006.

Fessant, F. L., S. Handurukande, A.-M. Kermarrec, and L. Massouli, Clustering in peer-to-peer file sharing workloads, 3rd Int'l Workshop on Peer-to-Peer Systems, IPTPS'04, Feb. 2004, San Diego, CA.

Gnutella Protocol Specification v0.4.

Karagiannis, T., P. Rodriguez, K. Papagiannaki, Should Internet service providers fear peer-assisted content distribution?, Proc. of the Internet Measurement Conf. 2005 pp. 6-6 Berkeley, CA.

Meo, M., F. Milan, QoS-aware content management in P2P networks, Int'l Workshop on Hot Topics in Peer-to-Peer Systems, Oct. 8, 2004, pp. 48-53.

"European Search Report", Mailed Date: Sep. 20, 2010, Application No. EP/08/74/7791, Filed Date: Sep. 9, 2010, pp. 10.

Ferreira, et al., "Locality in structured peer-to-peer networks", Journal of Parallel and Distributed Computing, vol. 66, No. 2, Feb. 1, 2006, pp. 257-273.

Bindal, et al., "Improving Traffic Locality in BitTorrent via Biased Neighbor Selection", 26th IEEE International Conference on Distributed Computing Systems, ICDCS, Jul. 4-7, 2006, pp. 10.

Karagiannis, et al., "Should Internet Service Providers Fear Peer-Assisted Content Distribution?", Retrieved <<http://delivery.acm.org/I0.1145/1260000/1251092/p6-karagiannis.pdf?keyl=1251092& key2=9495082821&coll=GUIDE&dl=GUIDE&CFID=101933008&&CFTOKEN=40443060 >>, Proceedings of Internet Management Conference, (IMC), Oct. 2005, pp. 63-76.

Chinese PT Application 200880018852.6; First Office Action dated Feb. 18, 2011; 12 pages.

Chinese PT Application 200880018852.6; Second Office Action dated Aug. 24, 2011; 17 pages.

Chinese PT Application 200880018852.6; Final Rejection dated Feb. 6, 2012; 10 pages.

CN Application 200880018852.6; Response to the Notice on Reexamination Dated Mar. 14, 2014, filed Apr. 15, 2014, 28 pages.

"International Search Report", Mailed Oct. 15, 2008, Application No. PCT/US2008/062917, Filed Date May 7, 2008, pp. 1-10.

CN Application 200880018852.6; Reply to Non-Final Office Action dated Feb. 18, 2011; 19 pages.

EP Application 08747791.5; Reply to Non-Final Office Action dated Apr. 6, 2011; 14 pages.

EP Application 08747791.5; Notice of Allowance dated Jul. 12, 2012; 8 pages.

EP Application 08747791.5; European Search Report mailed Sep. 17, 2010; 9 pages.

EP Application 12006545.3; Reply to Non-Final Office Action dated Jul. 22, 2013; 13 pages.

EP Application 12006545.3; European Search Report mailed Feb. 11, 2013; 7 pages.

Qureshi, Asfandyar, Exploring Proximity Based Peer Selection in a BitTorrent-like Protocol, published May 7, 2004, Available at: http://pdos.csail.mit.edu/6.824-2004/reports/asfandyar.pdf.

Fonseca, et al., "BitTorrent Protocol", published Apr. 2005, Available at: http://jonas.nitro.dk/bittorrent/bittorrent-rfc.html.

CN Application 200880018852.6; Notice on Reexamination dated Mar. 14, 2014, 17 pages.

"Notice of Re-examination Received for China Patent Application No. 200880018852.6", Mailed Date: Jun. 10, 2014, Filed Date: May 7, 2008, 21 Pages.

* cited by examiner

ISP-AWARE PEER-TO-PEER CONTENT EXCHANGE

BACKGROUND

Peer-to-peer (P2P) content distribution over the Internet is rapidly increasing. Studies have shown that P2P traffic contributes the largest portion of the Internet traffic based on their measurements of popular P2P systems. Most of this P2P traffic is contents provided by P2P users themselves. These users can join the P2P network via the Internet by connecting to active peers in the P2P network.

One problem, however, with this increase in P2P traffic on the Internet is that this type of traffic is detrimental to Internet Service Providers (ISP) because it increases an ISP's cost of doing business. This increase in the cost of doing business for the ISP is passed on to the user in the form of higher prices to access the Internet. This makes users unhappy. Thus, it is a double-edged sword for the ISP, who wants to keep prices low to attract customers but faces users wanting to exchange content using P2P content distribution.

The Internet consists of thousands of ISPs, which operate at different scales and serve different roles. Some ISPs provide Internet access to end-users and businesses, while others provide access to ISPs themselves. The relationships between ISPs can be summarized into 3 categories. First, there can be a customer-provider relationship (also called a transit relationship), which refers to one ISP purchasing Internet access from another ISP and paying for the bandwidth usage. Second, there can be a sibling relationship, which refers to the inter-connection among several ISPs belonging to the same organization. Even though each ISP might be managed separately from the perspective of network administration, traffic exchange among them does not involve any payment. Third, there can be a peering relationship, which refers to ISPs pairing with each other. Peering ISPs can exchange traffic directly that would otherwise have to go through their providers. This is a common relationship adopted to lower ISPs' payments to their own providers. To a certain extent, the traffic exchanged between two peering ISPs is free. However, when the traffic becomes highly asymmetric, one party will start charging the other based on bandwidth usage. Based on the ISP relationships, ISPs can be grouped together to form economic entities, whereby no payment is involved for traffic within an entity but traffic crossing entity boundaries does incur payment. Based on the sibling and peering relationships, such economic entities can be formed at two levels: (1) a sibling entity includes all ISPs that are siblings to each other; and (2) a peering entity includes not only all siblings, but also all ISPs that are peering with each other.

One reason that P2P traffic increases an ISP's cost of doing business is that in a P2P network peers randomly choose logical neighbors without any knowledge about the underlying physical topology. This can cause a topology mismatch between the P2P logical overlay network and physical underlying network. In a P2P system, all participating peers form a P2P network over a physical network. A P2P network is an abstract, logical network called an overlay network. This mismatch can cause a decrease in traffic to nearby peers and an increase in traffic to distant peers, which incurs additional transit costs for the ISP.

Another reason that P2P traffic increases an ISP's cost of doing business is that a P2P network without locality can increase the traffic congestion at the backbone of ISP. In the Internet, there is usually more abundant bandwidth available at the local level than at the global level. By way of example, within a home having multiple computers the computers are usually connected through a high bandwidth in-home network. In comparison, the outgoing bandwidth that is usually served by a cable modem or ADSL modem is usually one or two magnitude tighter than the in-home network. Multiple homes in a neighborhood are often connected through a switch with abundant intra-neighborhood bandwidth, while the outgoing bandwidth to the ISP gateway router may be provisioned with a rather limited bandwidth. If locality information is not used in the P2P application, the majority of the traffic will be inefficiently flow across distance. In this case, the backbone will be congested and the quality of service experienced by the end users will be reduced.

While P2P content distribution can be deployed to significantly lower the bandwidth costs of content providers, there will be a significant amount of traffic crossing entity boundaries, if the deployment does not consider the economics of ISPs. This extreme focuses solely on minimizing the bandwidth costs of the content providers. The other extreme is to restrict the P2P traffic to be contained within entity boundaries. For example, forbidding peers to share content with peers that are from a different ISP. This, however, might not fully utilize the potential of P2P. When an entity contains few peers, the sharing becomes difficult, and the content provider's bandwidth is increased accordingly. For practical P2P content distribution, it is important to strike a balance between these two extremes. In doing so, deployments will provide significant reductions in bandwidth costs to content providers and will improve the quality of service experienced by the end users without generating unacceptable levels of traffic across ISP boundaries.

The Internet can be viewed in multiple hierarchies. One step is to identify computers with different locality neighborhood. The bottom hierarchy is the in-home or in-corporation network of a single Internet IP address. Multiple computers within a home or a small corporation may be linked to the Internet through a network address translator (NAT) device. The in-home locality can be identified as multiple computers are identified to share the same external IP address.

The next level of the Internet locality is the Internet subnet neighborhood. Peers are identified that are with the same subnet gateway and subnet mask as the peers that are in the same subnet neighborhood. These are usually peers connected to a same local switch, with abundant intra-neighborhood bandwidth.

The higher level of Internet hierarchy can be viewed as a network of autonomous systems. An autonomous system (AS) is a subnetwork under separate administrative control having a common routing policy to the Internet. Within AS, the routing is done through the Internet gateway protocol (IGP). Across AS, the routing is done through border gateway protocol (BGP). Examples of ASes are networks of big companies or universities, national research networks, local or Internet service providers (ISPs), or international backbone providers. Currently, there are more than 15,000 ASes on the Internet. Each AS is connected to one or several other ASs with direct, physical links. A unique AS number (or ASN) is allocated to each AS for use in routing.

The Internet Protocol (IP) IP address of a peer can be mapped to one or more ASN for the peer. If multi-homed, an IP range can be mapped to multiple AS. This ASN can be used to determine to which Internet Service Provider the peer belongs. Typically, each AS maintains its own policies. The ISP controls the traffic with each AS and sets up policies for going outside of the AS (such as which paths to take). Current P2P content distribution schemes uses peer overlay constructions that consider each AS a separate entity. Relationships between the peers typically are not accounted for when building the peer overlay.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The ISP-aware P2P content exchange system and method includes exchanging content in a peer-to-peer (P2P) computer network by finding, classifying, and grouping the peers into different hierarchy of neighborhoods. These neighborhoods take into account the type of relationship between peers (including economic policies). These relationships are used to classify and group each peer. Based on this classification and grouping, content availability information is exchanged between peers, and peers are selected for content exchange. The result is that P2P traffic is more ISP friendly. This makes P2P traffic more cost effective for an ISP and allows the ISP to deliver a high quality of service to end users.

The ISP-aware P2P content exchange system and method make the content exchange ISP aware by using a peer overlay construction and P2P scheduling such that both are aware of the neighborhood hierarchy of the peers. The peer overlay construction uses the categorization and grouping of the peers. Peer nodes that are within a closer neighborhood are favored over those peer nodes that are in a distant neighborhood.

The ISP-aware P2P content exchange method first defines a peer's neighborhood hierarchy. This is achieved by using a peer's external address, a peer's subnet gateway and subnet mask, and a peer's unique Autonomous System (AS) number to identify neighbor peers. Based on this information, neighborhood relationships between peers can be determined. The mapping is used to classify each peer as a belonging to a certain neighborhood. Using these classifications, a peer overlay is constructed that favors peers in local neighborhoods.

The ISP-aware P2P content exchange method then divides the content into a plurality of blocks. Information about which peer possesses which block is known as block availability information. Depending on the neighborhood hierarchy, there are different levels of block availability information. These different levels include self-availability information (or which blocks a peer itself has), in-home availability information (or the total blocks that peers with the same external IP address have), subnet availability information (or the total blocks that peers with the same subnet gateway and subnet mask have), AS availability information (or the total blocks that peers with the same AS have), sibling neighborhood availability information (or the total blocks that peers in a sibling neighborhood have), peering neighborhood availability information (or which blocks a peering neighborhood has), and outside availability information (or which blocks peers outside the sibling and peering neighborhoods have). This block availability information can be exchanged differently depending on a neighbor peer's classification. In addition, the frequency of exchange can depend on a peer's classification, such that peers within a peer's sibling neighborhood may exchange block availability information more often that peers outside of the neighborhood.

Once block availability information has been exchanged, peers are selected for content exchange based on their classification. In addition, a peer selection proportion may be defined such that if a peer is downloading content and its download buffer is nearly full, a greater percentage of content is coming from peers within the download peer's neighborhood rather than outside. On the other hand, if the download buffer is nearly empty, the percentage can change such that a greater percentage of content now is coming from peers outside of the neighborhood. This is a dynamic process that depends on the buffer contents.

When the peers have been selected, the method then selects blocks that are to be exchanged. This block selection is based on the block availability information, such that the rarest blocks are exchanged before the more common blocks. The rareness of a block is found by counting the available blocks. Those blocks that are fewer in number are consider rarer than those blocks that are greater in number. If a block is within a peer's sibling neighborhood, blocks are exchanged that are rarest outside of the sibling and peering neighborhoods of the peer. If a block is outside of a peer's sibling and peering neighborhoods, then blocks are exchanged that are rarest within the sibling and peering neighborhoods of the outside peers.

It should be noted although the above discussion is related to the sibling and peering neighborhood versus the outside sibling and peering neighborhood, the same approach can be applied to any other neighborhood hierarchy as well. It should be also noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the ISP-aware P2P content exchange system and method, reference is made to the accompanying drawings, which form a part thereof, and in which is shown by way of illustration a specific example whereby the ISP-aware P2P content exchange system and method may be practiced. It is to be understood that other embodiments may be utilized and structural changes may be made without departing from the scope of the claimed subject matter.

I. System and Operational Overview

Figure 1:
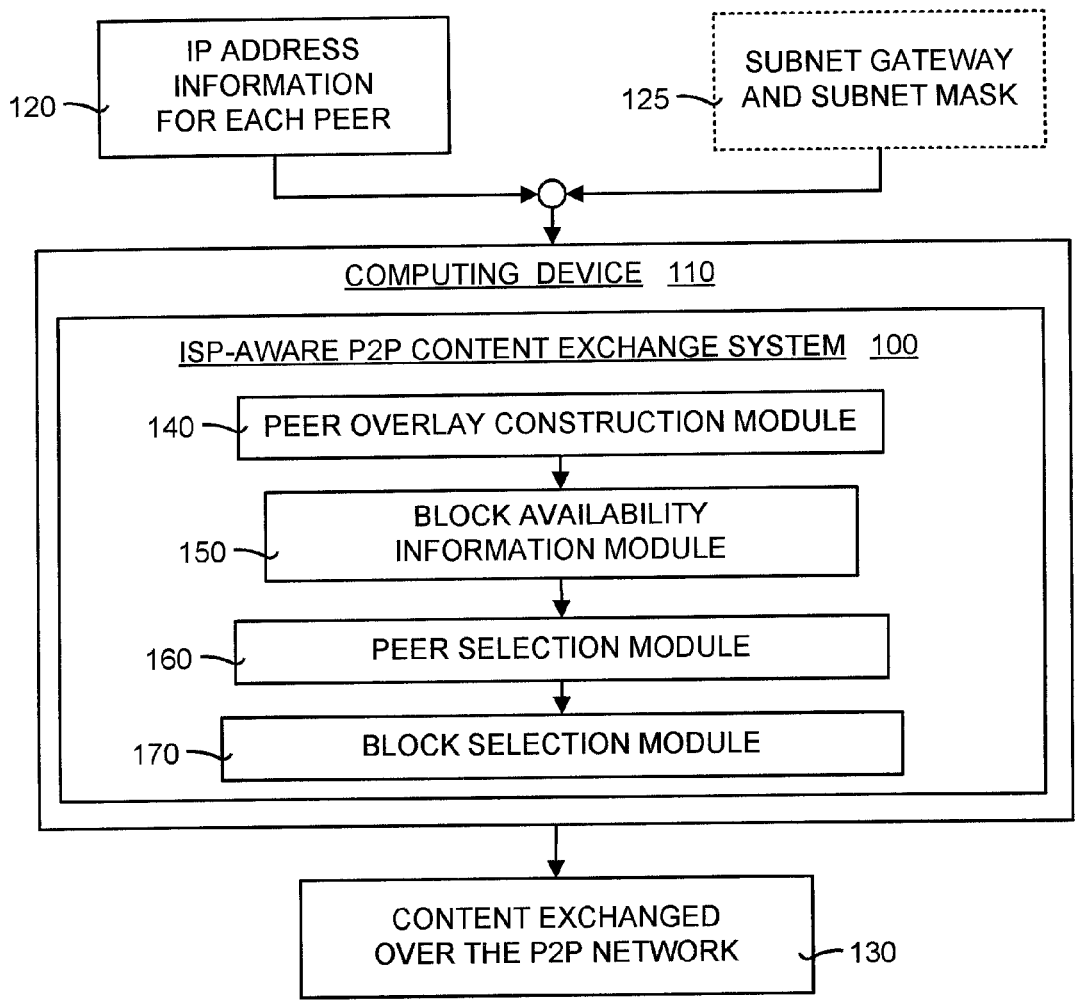
FIG. 1 is a block diagram illustrating an exemplary implementation of the ISP-aware P2P content exchange system disclosed herein.

FIG. 1 is a block diagram illustrating an exemplary implementation of the ISP-aware P2P content exchange system 100 disclosed herein. It should be noted that FIG. 1 is merely one of several ways in which the ISP-aware P2P content exchange system 100 may be implemented and used. The ISP-aware P2P content exchange system 100 may be implemented on various types of processing systems, such as on a central processing unit (CPU) or multi-core processing systems.

Referring to FIG. 1, the ISP-aware P2P content exchange system 100 is shown implemented on a computing device 110 (such as a desktop or laptop computer) that is connected to the Internet. The input to the ISP-aware P2P content exchange system 100 for each peer in the peer-to-peer network is an Internet Protocol (IP) address (box 120) and, if available, a subnet gateway and subnet mask (box 125). It should be noted that the subnet gateway and subnet mask are optional (as denoted by the dashed line). The output of the ISP-aware P2P content exchange system 100 is content for exchange over the P2P network (box 130).

The ISP-aware P2P content exchange system 100 includes software or program modules for execution on the computing device 110. In particular, the ISP-aware P2P content exchange system 100 includes a peer overly construction module 140 and a block availability information module 150. The peer overlay construction module 140 constructs a peer overlay taking into consideration groupings of AS numbers. The block availability information module 150 exchanges information between peers such that each peer knows which content is held by other peers.

The ISP-aware P2P content exchange system 100 also includes a peer selection module 160 and a block selection module 170. The peer selection module 160 uses the block availability information to selected peers for content exchange that will reduce traffic across IPS boundaries. Once the peers are selected, the block selection module 170 determines which blocks are exchanged by the selected peers. The operation of each of these modules will be discussed in detail below.

Figure 2:
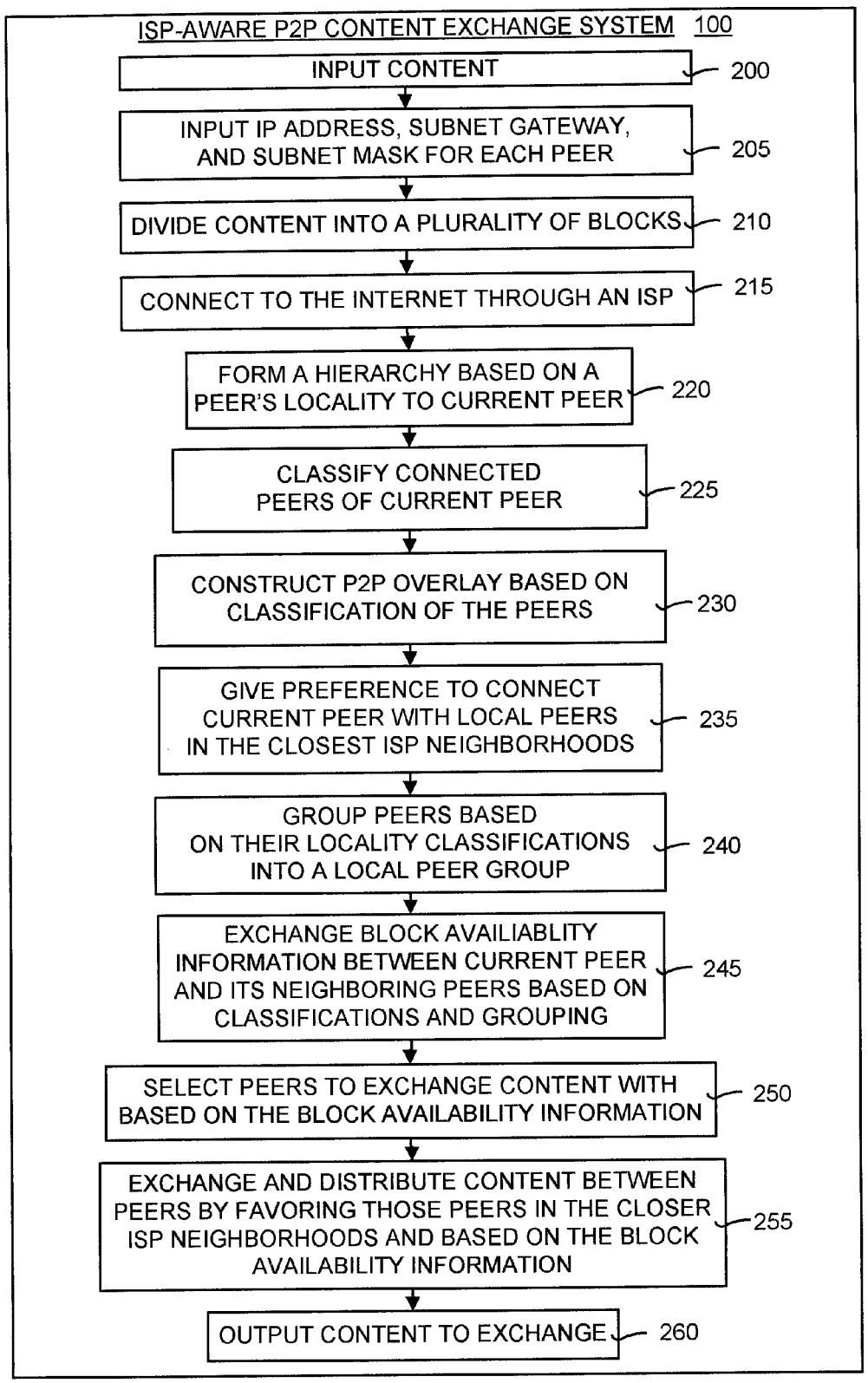
FIG. 2 is a flow diagram illustrating the general operation of the method used in the ISP-aware P2P content exchange system shown in FIG. 1.

FIG. 2 is a flow diagram illustrating the general operation of the method used in the ISP-aware P2P content exchange system 100 shown in FIG. 1. In general, the ISP-aware P2P content exchange method groups peers by their relationship with other peers and selects peers and content such that the P2P traffic over the Internet is ISP friendly. More specifically, the ISP-aware P2P content exchange method begins by inputting content to be exchanged over the P2P network (box 200). As used herein, the phrase "exchanging content" means that content is sent over the P2P network, received over the P2P network, or both. In other words, exchanging content can be a two-way transfer or a one-way transfer of data.

The method includes inputting an Internet Protocol (IP) address and optionally the subnet gateway and the subnet mask (if available) for each of the peers in the P2P network (box 205). Next, the content is divided into a plurality of blocks (box 210). These blocks are smaller than the original content. The method then forms a hierarchy by placing the rest of the peers on the Internet into different categories based on their locality to the current peer (box 220). The information used to form the hierarchy can be obtained from a number of sources, such as by observing the external IP address of the peer, by observing the subnet mask and the subnet gateway of the peer, from AS of the external IP obtained from the dumping of a BGP router, from sibling and peering relationship of the AS. Note that the term "current peer" is the current computer in the P2P network that is under consideration. All computers connected to the current peer are the connected peers. It should be noted that the connected peers will belong to a different neighborhood hierarchy than the current peer.

For a current peer each of its connected peers can be classified into a number of different ISP distance categories (box 225). These categories include an in-home/in-corporation neighborhood, an ISP subnet neighborhood, a self-AS neighborhood, a sibling AS neighborhood, a peering AS neighborhood, and outside of the sibling and peering AS neighborhoods.

The in-home/in-corporation neighborhood consists of peers that have the same external IP address. These are the peers within the same home or corporation that are connected through a high speed in-home/in-corporation network, and to a common Internet gateway (e.g., cable modem and/or ADSL modem). The ISP subnet neighborhood consists of peers that have the same subnet gateway and subnet mask within an ISP. The self AS neighborhood peers consists of peers that are mapped to the same AS of the current peer. The sibling neighborhood peers consists of peers that are mapped to the AS that is in sibling relationship with the current peer AS. The peering neighborhood peers consists of peers that are mapped to the AS that is in peering relationship with the current peer AS. The rest of the peers are mapped to the outside sibling and peering neighborhoods.

In some embodiments, the peer relationship may be classified using an AS topology graph. The AS topology graph allows the visualization of the routing of the Internet and can identify peering and sibling relationships.

The different categories of peers have different ISP distances. In particular, he in-home/in-corporation neighborhood has the closest (or nearest) ISP distance to the current peer. The ISP subnet neighborhood has the second closest ISP distance, and the self neighborhood peers have the third closest ISP distance. Moreover, the sibling neighborhood has a larger ISP distance than the self neighborhood, the peering neighborhood has an even larger ISP distance, and the outside sibling and peering neighborhood has the largest ISP distance.

Note that it might not be necessary to use all categories of peer neighborhood categories. The ISP-aware P2P content exchange system and method works with any neighborhood categories that have progressively increasing ISP distances. For example, in some embodiments a two category system is used whereby the two categories include the self AS neighborhood (all peers within the same AS) and the outside AS neighborhood (any peer with a different AS than the current peer AS). In other embodiments, the two categories includes a free-transit neighborhood (consist of self, sibling and peering AS neighborhood) and an outside sibling and peering neighborhood. In still other embodiments, a three category system is used, with the three categories including an in-home/in-corporation neighborhood, a self AS and sibling AS neighborhood, and an outside sibling AS neighborhood (the combination of the peering AS neighborhood and the outside peering and sibling AS neighborhood).

Next, a peer overlay is constructed based on the classification of the peers (box 230). During the construction of the peer overlay, preference is given to connect the current peer with local peers in the closer ISP neighborhoods (box 235). The system 100 then group all the peers based on their locality classification into a local peer group (box 240). Block availability information then is exchanged between a current peer and its neighboring peers based on the classification and groupings (box 245). Peers are selected to exchange content with based on the block availability information (box 250). Content is exchanged and distributed between peers by favoring those peers in the closer neighborhoods of the ISP and based on the block availability information (box 255). The output of the method is content to be exchanged (box 260).

II. Operational Details

Each of the modules discussed above will now be discussed in further detail. The operation details of the ISP-aware P2P content exchange method will be discussed in terms of two general operations. First, the operation of constructing a peer overlay will be discussed, followed by a discussion of the P2P scheduling performed by the method.

Peer Overlay Construction

The peer overlay is an abstract, logical network of the P2P network. The construction utilizes the categorization and grouping of the peers. It is assumed that the traffic with a short (or close) ISP distance is more favorable than the traffic across a long ISP distance. One of the main ideas behind constructing the peer overlay is that peer nodes that are closer in ISP distance are favored compared over peer nodes that are far away in ISP distance.

Figure 3:
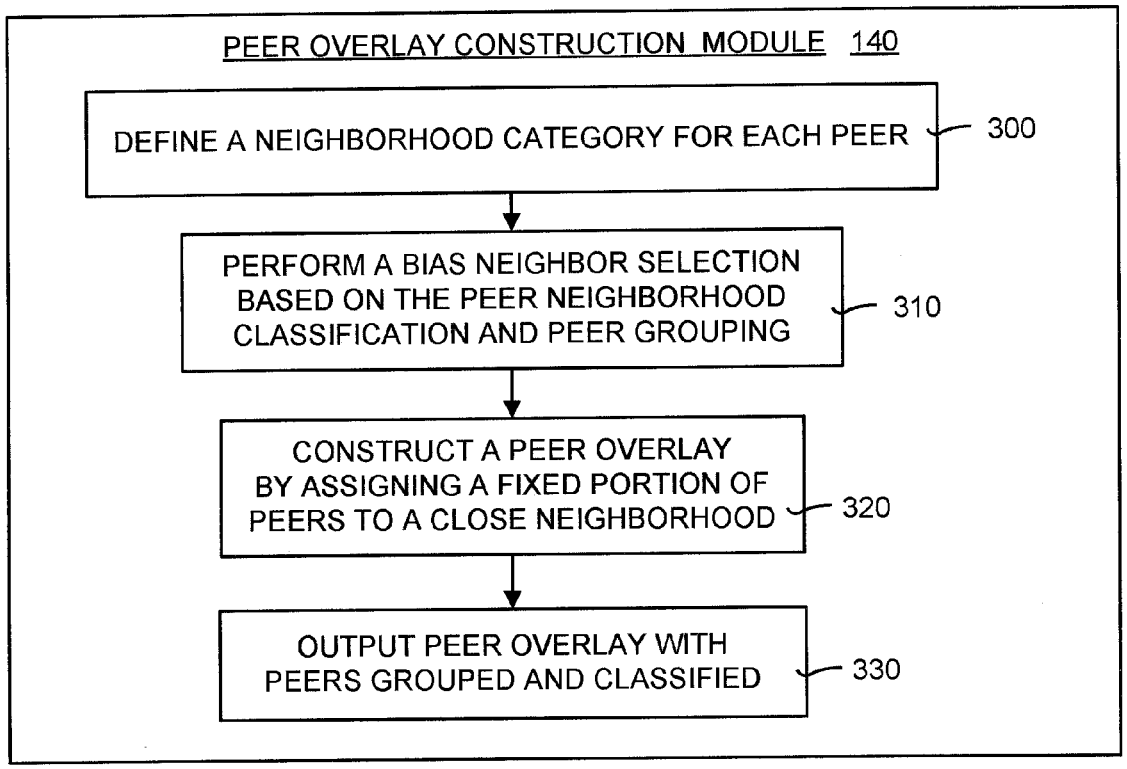
FIG. 3 is a flow diagram illustrating the detailed operation of the peer overlay construction module shown in FIG. 1.

FIG. 3 is a flow diagram illustrating the detailed operation of the peer overlay construction module 140 shown in FIG. 1. In general, the module 140 constructs a peer overlay that classifies and groups each peer. The module 140 begins by defining a neighborhood category for each peer (box 300).

The module 140 performs a biased neighbor selection based on the peer neighborhood categorization and grouping (box 310). The selection is biased such that it favors those peers that are within a peer's neighborhood with shorter ISP distance. The module 140 uses a centralized bias section technique to construct the peer overlay. In particular, the module 140 constructs a peer overlay by assigning a fixed portion of peers to a close neighborhood (box 320). For example, when using a three-category neighborhood system a centralized tracker is used to tracks the peer nodes. The tracker selects a portion of its neighborhood peers with the remainder of the peers located outside of the neighborhood.

By way of example, suppose that 40% of neighborhood peers are reserved for peers within the closest neighborhood, 30% of neighborhood peers are reserved for peers within the second closest neighborhood, and the rest are for peers in the furthest neighborhood. The proportion can be set manually or automatically. If there are not enough peers in a close neighborhood to fill each of the slots then the module 140 can distribute the unfilled neighbor peer slot to the next closest neighborhood. One constraint is that the tracker cannot pick 100% peers in the closest neighborhood because seedling peers are needed that are located outside the neighborhood. The output of the module 140 is a peer overlay with the peers grouped and classified (box 330).

P2P Scheduling

The P2P scheduling is an ISP-aware mesh-based content distribution scheduling. As described above, the method has already constructed a mesh-based content distribution topology. The P2P scheduling divides the content into a number of blocks and then has each of the peers exchange status information In other words, each peer tells the other peer which block it possesses.

Figure 4:
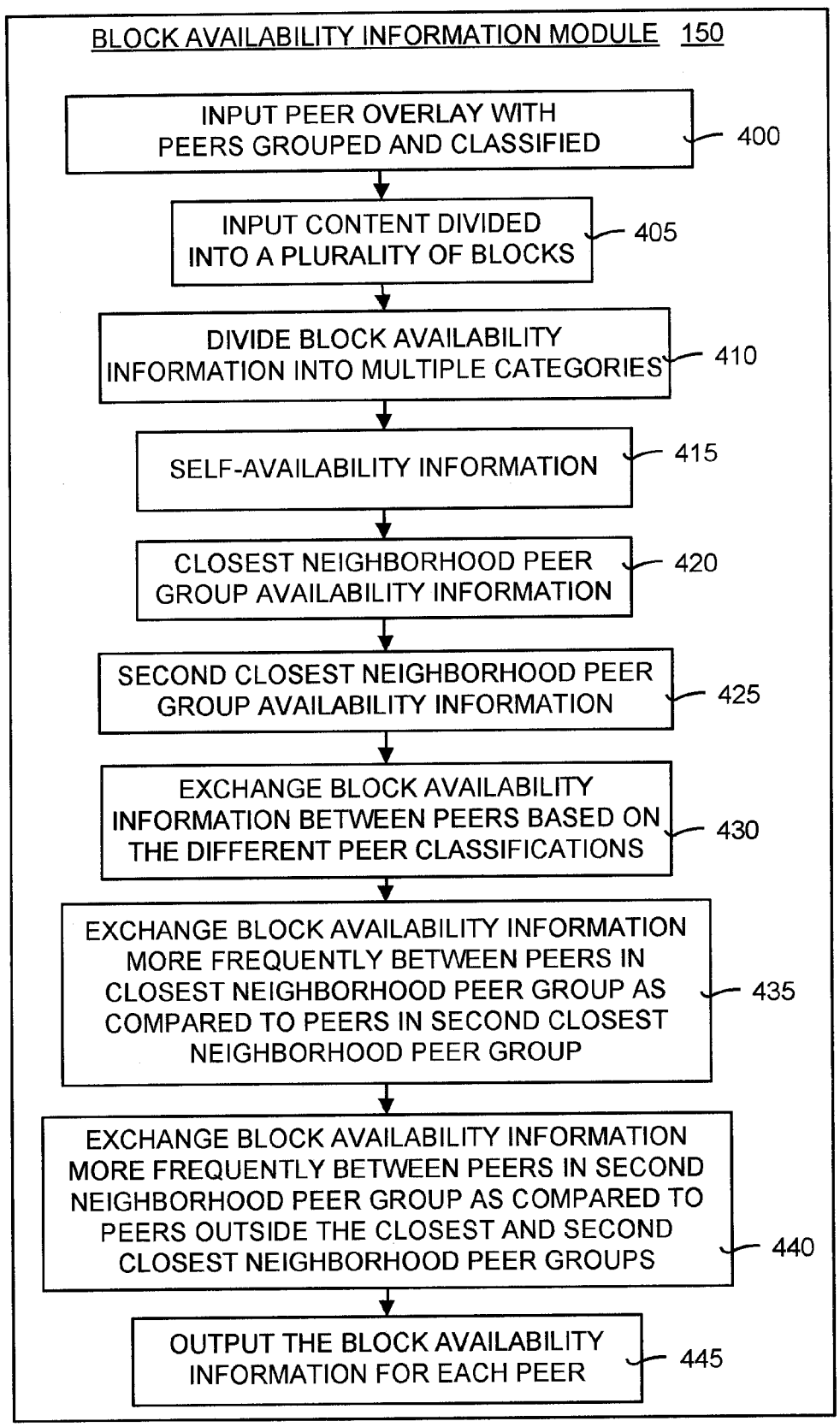
FIG. 4 is a flow diagram illustrating the detailed operation of the block availability information module shown in FIG. 1.

FIG. 4 is a flow diagram illustrating the detailed operation of the block availability information module 150 shown in FIG. 1. In general, the block availability information module 150 exchanges information between peers such that each peer knows which content is held by other peers. More specifically, the module 150 begins by inputting the peer overlay with the peers grouped and classified (box 400). The module 150 also inputs content that has been divided into a plurality of blocks (box 405).

The block availability information is divided in multiple categories corresponding to the hierarchy categories of the neighborhood (box 410). For example, if the system 100 uses a three-category neighborhood hierarchy then the block availability information is also divided into three categories, Some of the available categories include: (a) self-availability information (box 415); (b) closest neighborhood peer group availability information (box 420); and (c) second closest neighborhood peer group availability information (box 425). Self-availability information includes what blocks a certain current requesting peer possesses. The closest neighborhood peer group availability information includes the total blocks that are available in the current requesting peer and the peers that are in the closest neighborhood (or the union of all the blocks of the current peer and the closest neighborhood connected peers). The second closest neighborhood availability information is the blocks that are available in the peering neighborhood. It should be noted that some or all of (a), (b), and (c) can be exchanged, or any combination thereof. In addition, in some embodiments each of the different types of block availability information is combined and sent as a single send.

The module 150 exchanges block availability information between peers based on the different peer classifications (box 430). For example, the block availability information is exchanged more frequently between peers within the closest neighborhood peer group of the current peer as compared to peers within the second closest neighborhood peer group (box 435). Moreover, the block availability information is exchanged more frequently between peers within the second closest neighborhood peer group as compared to peers outside the closest and the second closest neighborhood peer groups (box 440). The output of the module 150 is the block availability information for each peer (box 445).

In some embodiments, different block availability information is exchanged depending on the classification of the peer. Moreover, as stated above, the frequency for this exchange is different for each classification. This idea is to have less traffic between two peers outside of a neighborhood as compared to two peers within, for example, a sibling or peering neighborhood. In other words, it is desirable to limit the frequency that the block availability information is exchanged between peers outside of the same neighborhood.

Figure 5:
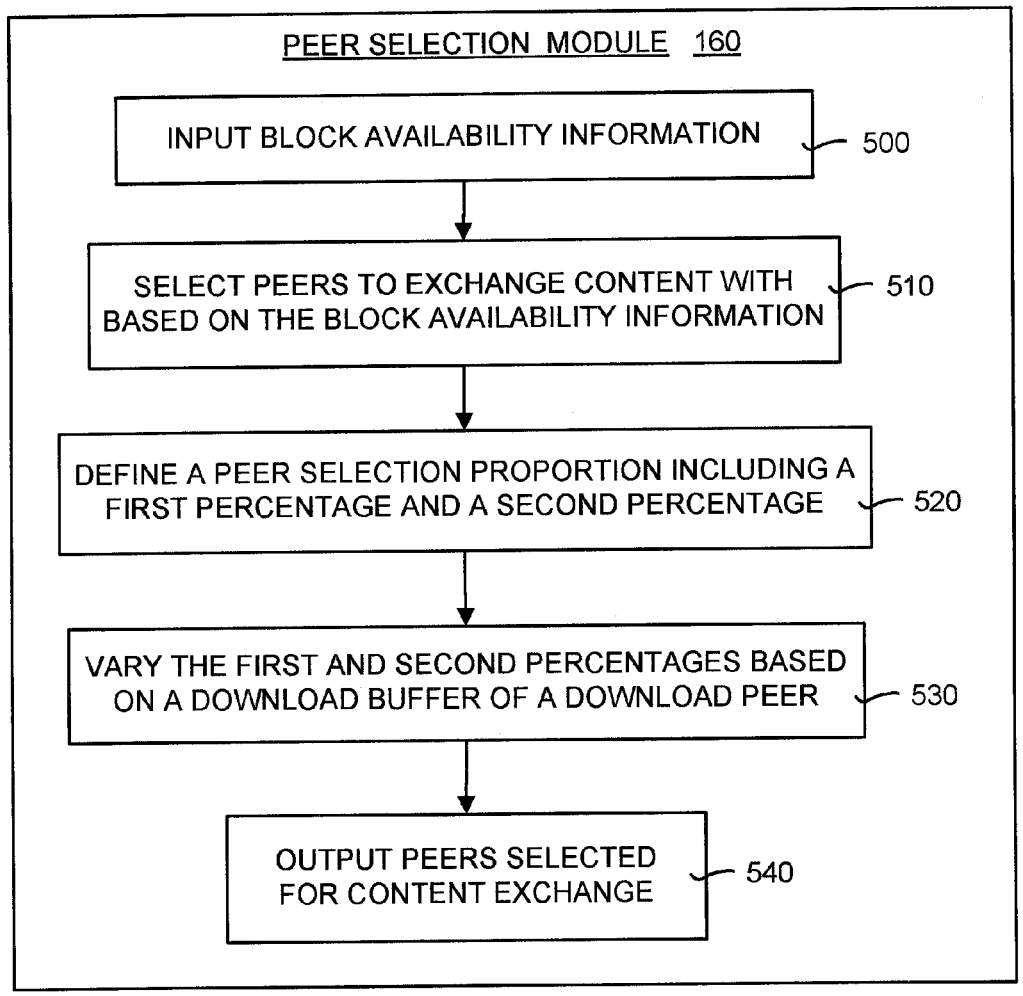
FIG. 5 is a flow diagram illustrating the detailed operation of the peer selection module shown in FIG. 1.

FIG. 5 is a flow diagram illustrating the detailed operation of the peer selection module 160 shown in FIG. 1. The module 160 begins by inputting the block availability information (box 500). Next, peers are selected to exchange content with based on the block availability information (box 510). The peer selection is made such that a peer devotes most of its upload bandwidth to peers within its closest or second closest neighborhood peer groups and less bandwidth to peers outside these neighborhoods.

As shown in FIG. 5, the module 160 defines a peer selection proportion that includes a first percentage and a second percentage (box 520). The first percentage represents peers within a download peer's closest and second closest neighborhood peer groups, while the second percentage represents peers outside these neighborhoods. Together, the first and second percentages sum to one-hundred percent. The first and second percentages can be varied based on a download buffer of a download peer such that when the buffer is more full the first percentage is higher and when the download buffer is more empty the first percentage is lower (box 530).

By way of example, assume that initially the first percentage is 70% and the second percentage is 30%. This means that 70% of the peers from which content is being received are from within the download peer's closest and second closes neighborhood peer groups, and 30% of the peers are not. These percentages can adjusted based on the progress (or buffer status or contents) of the download peer. In other words, if there is less in the buffer then the percentages can change (say 55%/45%) such that more of the outside peers are used. Similarly, if there is more in the buffer, then the percentages can change accordingly (say 65%/35%) such that more of the neighborhood peers are used. This is a dynamic process, where the percentages are constantly changing.

Figure 6:
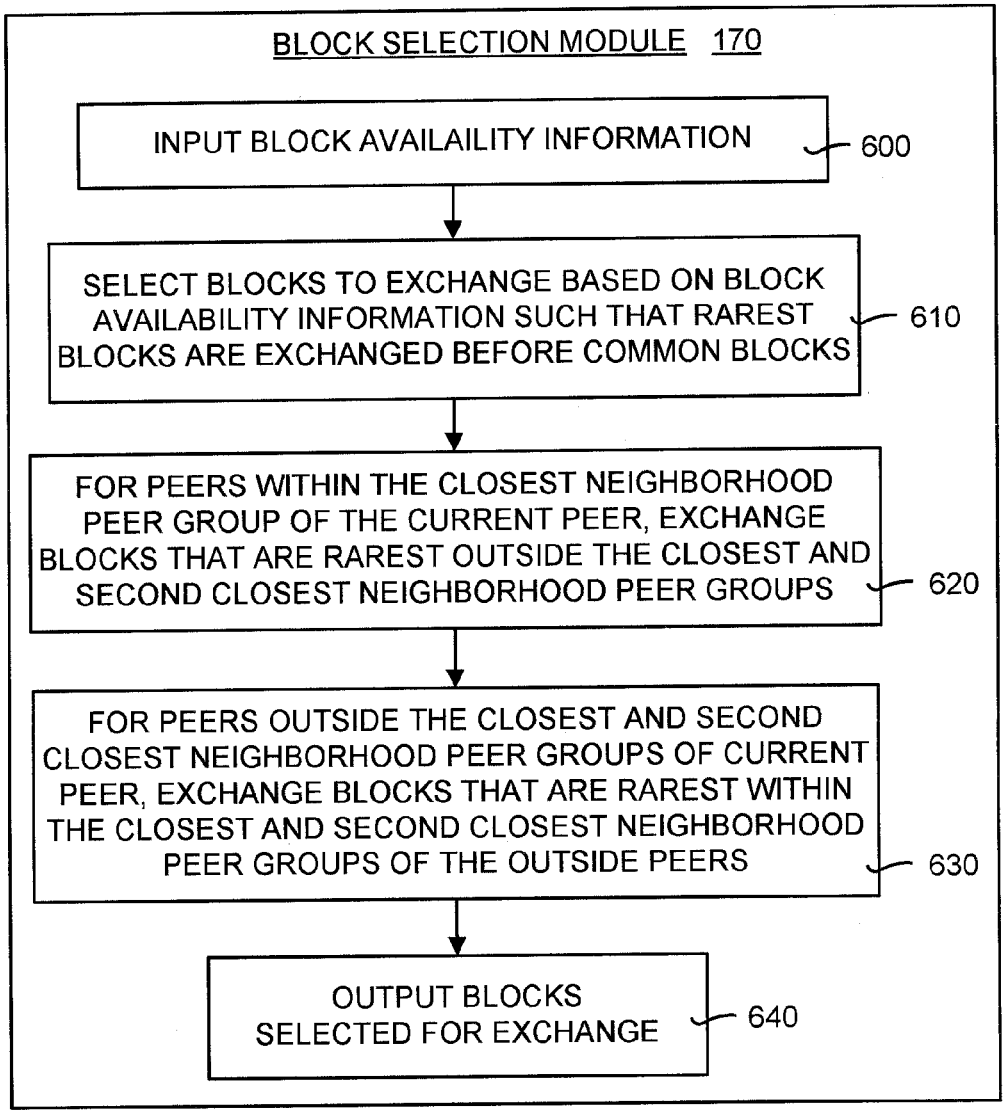
FIG. 6 is a flow diagram illustrating the detailed operation of the block selection module shown in FIG. 1.

FIG. 6 is a flow diagram illustrating the detailed operation of the block selection module 170 shown in FIG. 1. The block selection module 170 decides which blocks among the selected peers are exchanged. The module 170 inputs the block availability information (box 600). Blocks then are selected for exchange based on the block availability information (box 610). In some embodiments, the blocks are selected such that the rarest blocks are exchanged before the more common (or less rare) blocks. In order to find the rarest blocks, a count is performed so that each block has a count (or a number) associated with it. If a block is not available, then it is considered the rarest block. In other embodiments random selection is used. For example, in P2P streaming delivery, random and rarest selection often are combined. When the buffer is abundant the rarest blocks far into the future can be requested. When the buffer is limited, peers should only request random blocks of near future.

For peers within the closest neighborhood peer group of the current peer, the blocks exchanged are those blocks that are the rarest outside of the closest and second closest neighborhood peer groups (box 620). On the other hand, for peers outside of the closest and second closest neighborhood peer groups, the blocks that are exchanged are those blocks that are rarest within the closest and second closest neighborhood peer groups of the outside peers (box 630). The output of the module 170 are the blocks that were selected for exchange (box 640).

III. Exemplary Operating Environment

The ISP-aware P2P content exchange system and method is designed to operate in a computing environment. The following discussion is intended to provide a brief, general description of a suitable computing environment in which the ISP-aware P2P content exchange system and method may be implemented.

Figure 7:
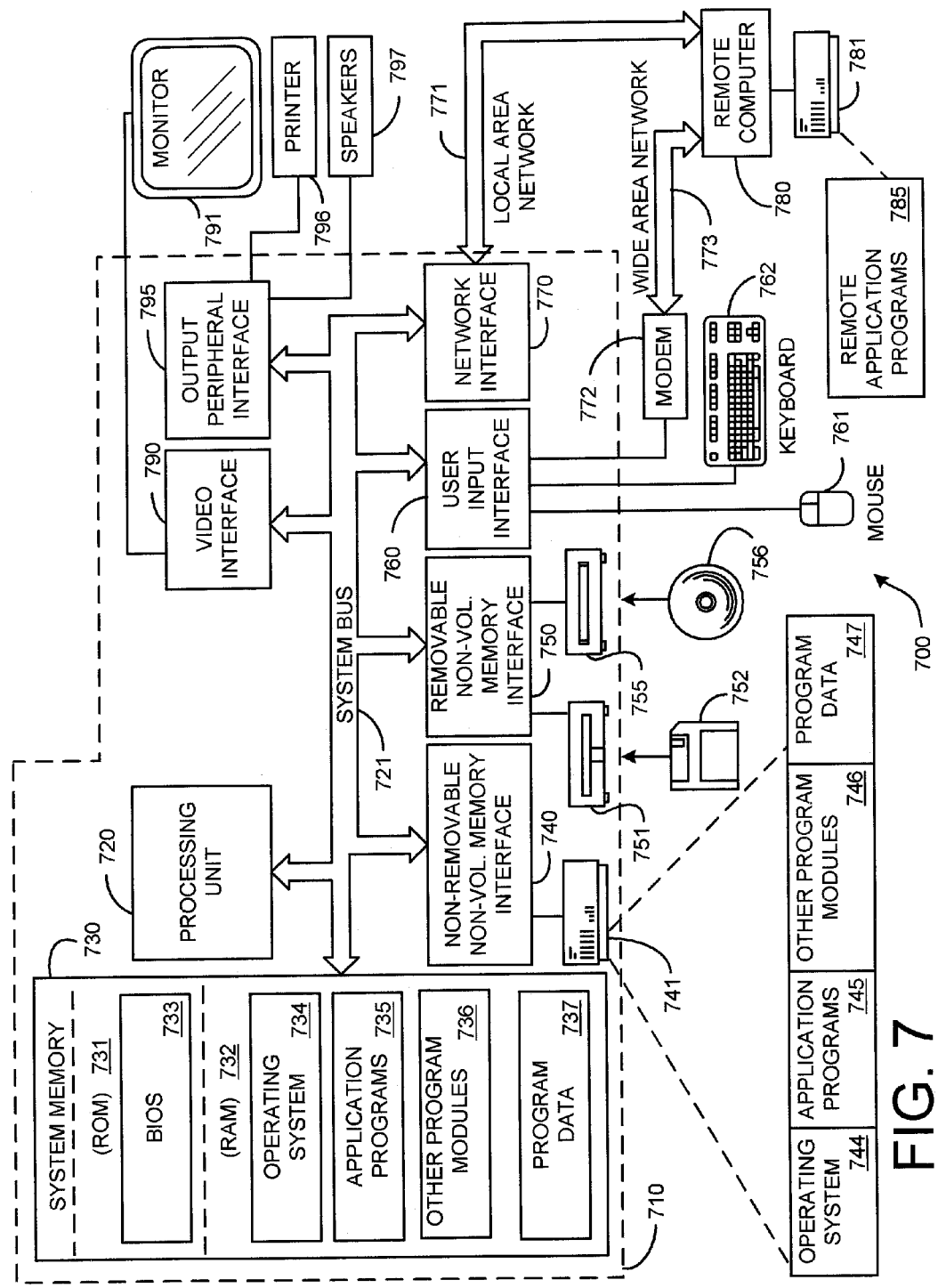
FIG. 7 illustrates an example of a suitable computing system environment in which the ISP-aware P2P content exchange system and method shown in FIGS. 1-6 may be implemented.

FIG. 7 illustrates an example of a suitable computing system environment in which the ISP-aware P2P content exchange system and method shown in FIGS. 1-6 may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment.

The ISP-aware P2P content exchange system and method is operational with numerous other general purpose or special purpose computing system environments or configurations. Examples of well known computing systems, environments, and/or configurations that may be suitable for use with the ISP-aware P2P content exchange system and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The ISP-aware P2P content exchange system and method may be described in the general context of computer-executable instructions, such as program modules, being executed by a computer. Generally, program modules include routines, programs, objects, components, data structures, etc., that perform particular tasks or implement particular abstract data types. The ISP-aware P2P content exchange system and method may also be practiced in distributed computing environments where tasks are performed by remote processing devices that are linked through a communications network. In a distributed computing environment, program modules may be located in both local and remote computer storage media including memory storage devices. With reference to FIG. 7, an exemplary system for the ISP-aware P2P content exchange system and method includes a general-purpose computing device in the form of a computer 710 (the personal computing device 110 is an example of the computer 710).

Components of the computer 710 may include, but are not limited to, a processing unit 720 (such as a central processing unit, CPU), a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 710 typically includes a variety of computer readable media. Computer readable media can be any available media that can be accessed by the computer 710 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 710. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 740 includes computer storage media in the form of volatile and/or nonvolatile memory such as read only memory (ROM) 731 and random access memory (RAM) 732. A basic input/output system 733 (BIOS), containing the basic routines that help to transfer information between elements within the computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information (or data) into the computer 710 through input devices such as a keyboard 762, pointing device 761, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 720 through a user input interface 760 that is coupled to the system bus 721, but may be connected by other interface and bus structures, such as, for example, a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method performed by one or more computing devices for exchanging a plurality of blocks of content in a peer-to-peer network, the method comprising:

classifying a plurality of peers in the peer-to-peer network based on distances of the plurality of peers from a current peer, wherein the classifying identifies first peers that are each within a first distance of the current peer and second peers that are not within the first distance of the current peer;

constructing a peer overlay that connects the current peer to individual first peers and individual second peers;

identifying a first block of content for the current peer to exchange with a selected individual first peer of the peer overlay that is within the first distance of the current peer, the first block being identified based on a number of the individual second peers of the peer overlay that have the first block and are not within the first distance of the current peer;

identifying a second block of content for the current peer to exchange with a selected individual second peer of the peer overlay, the second block being identified based on a number of the individual first peers of the peer overlay that have the second block;

exchanging the first block with the selected individual first peer; and exchanging the second block with the selected individual second peer.

2. The method of claim 1, further comprising determining the distances using at least one of IP addresses of the plurality of peers, subnet masks of the plurality of peers, or subnet gateways of the plurality of peers.

3. The method of claim 1, wherein constructing the peer overlay further comprises performing a biased neighbor selection.

4. The method of claim 3, wherein constructing the peer overlay further comprises assigning a fixed portion of the first peers to be connected to the current peer in the peer overlay.

5. The method of claim 1, wherein the individual first peers comprise a closest group of peers that are closest to the current peer based on the distances and a next-closest group of peers that are next-closest to the current peer based on the distances.

6. The method of claim 1, wherein the individual first peers are within a sibling neighborhood of the current peer and the individual second peers are outside of the sibling neighborhood.

7. The method of claim 6, further comprising exchanging block availability information with the individual first peers and the individual second peers of the peer overlay.

8. The method of claim 7, wherein the block availability information further comprises:
- self-availability information that identifies certain blocks that the current peer has available;
- first availability information that identifies further blocks that are available from the individual first peers; and
- second availability information that identifies additional blocks that are available from the individual second peers.

9. The method of claim 8, further comprising:
exchanging the block availability information more frequently with the individual first peers as compared to the individual second peers.

10. The method of claim 1, wherein the first block is rarest among the individual second peers.

11. The method of claim 10, wherein the second block is rarest among the individual first peers and at least some other peers of the peer overlay that are relatively closer to the current peer than the second peers.

12. A current peer comprising:
- at least one hardware processing unit; and
- at least one hardware computer storage media storing computer readable instructions which, when executed by the processing unit, cause the processing unit to:
  - classify a plurality of peers in a peer-to-peer network based on distances of the plurality of peers from the current peer to identify first peers that are each within a first distance of the current peer and second peers that are not within the first distance of the current peer;
  - connect the current peer to individual first peers and individual second peers via a peer overlay;
  - identify a first block of content for the current peer to exchange with a selected individual first peer of the peer overlay that is within the first distance of the current peer, the first block being identified based on a number of the individual second peers of the peer overlay that have the first block and are not within the first distance of the current peer; and
  - identify a second block of content for the current peer to exchange with a selected individual second peer of the peer overlay, the second block being identified based on a number of the individual first peers of the peer overlay that have the second block.

13. The current peer of claim 12, wherein the distances are Internet Service Provider (ISP) distances such that the individual first peers of the peer overlay are within a first ISP distance of the current peer, at least some other peers of the peer overlay are within a second ISP distance of the current peer that is greater than the first ISP distance, and the individual second peers of the peer overlay are more than the second ISP distance away from the current peer.

14. The current peer of claim 13, wherein the first block is rarest among the individual second peers.

15. The current peer of claim 14, wherein the second block is rarest among the individual first peers and the at least some other peers.

16. The current peer of claim 15, wherein the individual first peers are within a sibling neighborhood of the current peer, the at least some other peers are within a peering neighborhood of the current peer, and the individual second peers are outside of both the sibling neighborhood and the peering neighborhood.

17. One or more computer-readable hardware memory devices or hardware storage devices storing computer readable instructions which, when executed by a processing unit of a computing device, cause the processing unit to perform acts comprising:
- classifying a plurality of peers in a peer-to-peer network based on distances of the plurality of peers from a current peer to identify first peers that are each within a first distance of the current peer and second peers that are not within the first distance of the current peer;
- connecting the current peer to individual first peers and individual second peers via a peer overlay;
- identifying a first block of content for the current peer to exchange with a selected individual first peer of the peer overlay that is within the first distance of the current peer, the first block being identified based on a number of the individual second peers of the peer overlay that have the first block and are not within the first distance of the current peer; and
- identifying a second block of content for the current peer to exchange with a selected individual second peer of the peer overlay, the second block being identified based on a number of the individual first peers of the peer overlay that have the second block.

18. The one or more computer-readable hardware memory devices or hardware storage devices of claim 17, wherein the first block is identified based partly or entirely on the number of the individual second peers and the second block is identified based partly or entirely on the number of the individual first peers.

19. The one or more computer-readable hardware memory devices or hardware storage devices of claim 17, the acts further comprising:
- determining a first percentage of the individual first peers with which to exchange the content;
- determining a second percentage of the individual second peers with which to exchange the content; and
- responsive to a determination that a download buffer has become relatively more empty, increasing the second percentage and decreasing the first percentage.

20. The one or more computer-readable hardware memory devices or hardware storage devices of claim 17, the acts further comprising:
- determining a first percentage of the individual first peers with which to exchange the content;
- determining a second percentage of the individual second peers with which to exchange the content; and
- responsive to a determination that a download buffer has become relatively more full, increasing the first percentage and decreasing the second percentage.

* * * * *